US012794933B2

(12) United States Patent
Illum et al.

(10) Patent No.: US 12,794,933 B2
(45) **Date of Patent: *Nov. 10, 2026**

(54) SYSTEMS AND METHODS FOR IDENTIFYING PATTERNS IN BLOCKCHAIN ACTIVITIES

(71) Applicant: Chainalysis Inc., New York, NY (US)

(72) Inventors: Jacob Illum, New York, NY (US); Michael Gronager, New York, NY (US); Patrick Curran, New York, NY (US); Jens Tuxen, New York, NY (US); Shilpa Deshpande, New York, NY (US)

(73) Assignee: Chainalysis Inc., New York, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/902,826

(22) Filed: Sep. 30, 2024

(65) Prior Publication Data

US 2025/0023908 A1 Jan. 16, 2025

Related U.S. Application Data

(63) Continuation of application No. 18/297,555, filed on Apr. 7, 2023, now Pat. No. 12,107,882.

(60) Provisional application No. 63/329,054, filed on Apr. 8, 2022.

(51) Int. Cl.
*H04L 9/40* (2022.01)
*H04L 67/1097* (2022.01)

(52) U.S. Cl.
CPC ...... *H04L 63/1441* (2013.01); *H04L 67/1097* (2013.01)

(58) Field of Classification Search
CPC ........................ H04L 63/1441; H04L 67/1097
See application file for complete search history.

(56) References Cited

U.S. PATENT DOCUMENTS

2019/0282906 A1* 9/2019 Yong .................. G06Q 20/0658
2020/0213085 A1* 7/2020 Fletcher ................ H04L 9/3239
2020/0311646 A1* 10/2020 Koenig ................. H04L 9/3297
2021/0383395 A1* 12/2021 Galka .................. G06Q 20/065
2022/0067738 A1* 3/2022 Fang .................... G06Q 20/389
2023/0070625 A1* 3/2023 Gaur .................... G06Q 20/389

* cited by examiner

*Primary Examiner* — Brian J. Gillis
*Assistant Examiner* — Juan C Turriate Gastulo
(74) *Attorney, Agent, or Firm* — Foley & Lardner LLP

(57) ABSTRACT

Systems and methods for identifying patterns in blockchain activities based on multi-modal data using artificial intelligence models that compensate for training data featuring a high proportion of missing data points. For example, the system may receive blockchain activity record data for a plurality of blockchain activities involving a plurality of blockchain accounts. The system may input the data into an artificial intelligence model, wherein the artificial intelligence model is trained to identify serial relationships of related blockchain activities corresponding to inputted target blockchain activities based on proportions of digital assets at subsets of blockchain accounts of the plurality of blockchain accounts. The system may receive an output from the artificial intelligence model. The system may generate for display, in a user interface, a visualization of the target blockchain activity based on the output.

20 Claims, 5 Drawing Sheets

SYSTEMS AND METHODS FOR IDENTIFYING PATTERNS IN BLOCKCHAIN ACTIVITIES

CROSS-REFERENCE TO RELATED APPLICATIONS

This application is a continuation of U.S. patent application Ser. No. 18/297,555, filed Apr. 7, 2023, which claims the benefit of priority of U.S. Provisional Application No. 63/329,054, filed Apr. 8, 2022. The content of the foregoing applications is incorporated herein in its entirety by reference.

BACKGROUND

A blockchain is a distributed database that is shared among the nodes of a computer network. The blockchain stores information electronically in a digital format as "blocks" in the blockchain. The proliferation of blockchain technology has led to an increase in the use of several applications of this technology such as cryptocurrencies, smart contracts, and decentralized applications. Cryptocurrency is a virtual or digital currency exchanged through a computer network that is not reliant on any central authority, such as a government or bank, to uphold or maintain it. Smart contracts are computer programs stored on a blockchain that run when predetermined conditions are met. Smart contracts are used to automate the execution of an agreement so that all participants can be immediately certain of the outcome, without any intermediary's involvement or time loss. Smart contracts can also automate a workflow, triggering the next action when conditions are met. Finally, a decentralized application ("dApp") is a type of distributed open-source software application that runs on a peer-to-peer ("P2P") blockchain network rather than on a single computer.

A notable characteristic of blockchain technology, and its effect on the aforementioned applications, is that it functions without a central authority. That is, blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks, thus leading to blockchain records being immutable.

In many instances, to use the aforementioned applications, as well as blockchain technology in general, users are required to use specialized computer programs that are linked to digital wallets that allow users to store, manage, and trade their cryptocurrencies. However, as blockchain technology does not rely on a central authority and interactions between blockchain-based applications are linked to the digital wallet and not an identity of a user behind the interaction, blockchain technology may be used to mask the identity of a user or entity behind the interactions. As such, blockchain technology has the potential to be used for illegal, malicious, and/or fraudulent activities, with little recourse to (or knowledge of) the users or entities behind the interactions, as well as fully understanding the scope and nature of the activities themselves.

SUMMARY

Systems and methods are described herein for novel uses and/or improvements to blockchains and blockchain technology, particularly in order to address, but not limited to, the technical problems described above. For example, the systems and methods may relate to monitoring, determining, and/or facilitating discovery of blockchain activities, users/entities involved in blockchain activities, a nature or scope of blockchain activities, an intent of a blockchain activity, and/or any other information related to one or more blockchain activities.

As one example, methods and systems are described herein for the use of artificial intelligence to detect patterns in blockchain data to provide the aforementioned technical benefits. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results. These technical problems present an inherent problem with attempting to use an artificial intelligence-based solution in identifying patterns in blockchain activities.

Furthermore, the detection of illegal, malicious, and/or fraudulent blockchain activities presents a unique challenge compared with the detection of other events because the detection of a these blockchain activities requires an immediate response. For example, if a fraudulent blockchain activity is detected, a system must take immediate action to prevent the fraud. If not, a user may be left with little recourse due to the immutable nature of blockchain activities. Thus, the system must act quickly, accurately, and with a high amount of precision.

However, the use of artificial intelligence for this application has a fundamental flaw that presents a unique technical challenge; namely, artificial intelligence, whether based on machine learning, deep learning, etc., requires ample and high-quality training data to train a model to make accurate and precise determinations. Such training data does not exist for blockchain activities. Furthermore, as blockchain activities are linked to digital wallets as opposed to user identities, it is difficult to obtain any training data for use in monitoring, determining, and/or facilitating discovery of blockchain activities, users/entities involved in blockchain activities, a nature or scope of a blockchain activities, an intent of a blockchain activity, and/or any other information related to one or more blockchain activities.

To overcome these technical deficiencies in conventional systems, systems and methods disclosed herein identify patterns in blockchain activities based on multi-modal data using artificial intelligence models that compensate for training data featuring a high proportion of missing data points. For example, the missing data points may comprise intermediary blockchain activity and/or unknown entities related to blockchain accounts. Furthermore, many blockchain activities involve fungible digital assets that are passed through numerous intermediary accounts as part of an exponentially large pool of blockchain activity data. Specifically, the system is trained on proportions of digital assets at subsets of blockchain accounts of the plurality of blockchain accounts.

For example, the system may use the proportions of digital assets at a given blockchain account as a metric for determining whether or not the given blockchain account is related to a target blockchain activity. Notably, the target blockchain activity may include a series of intermediary activities. These intermediary activities may comprise transactions of digital assets that are either indistinguishable from other digital assets by their nature (e.g., the assets are fungible) or may be indistinguishable due to the volume of related and/or unrelated blockchain activities occurring. However, the system may identify patterns in transactions by monitoring the balance of digital assets at a given account and determining based on that balance whether or not a transfer of digital assets corresponding to the target blockchain activity has occurred. By doing so, the system does not need to generate training data or track individual, intermediary blockchain activities. By instead training the model at the aggregate level, the system may overcome the problem of a high proportion of missing data points.

Furthermore, by monitoring blockchain activities at this aggregated level and only for intermediary blockchain activities that are relevant, the system may generate visualizations of this data that is more easily digestible for a user. For example, the system may retrieve blockchain activity record data from a blockchain node. The blockchain record data may comprise blockchain activities and information about the blockchain activities (e.g., such as information about the interactions between accounts, addresses, and contracts/programs involved in the transactions). The system may retrieve this information directly from a blockchain node or may retrieve this information from an indexing service (e.g., that previously retrieved and/or indexed the data).

In some aspects, systems and methods for identifying patterns in blockchain activities based on multi-modal data using artificial intelligence models that compensate for training data featuring a high proportion of missing data points are described. For example, the system may receive blockchain activity record data for a plurality of blockchain activities involving a plurality of blockchain accounts. The system may receive a first user input selecting a target blockchain activity. The system may generate a feature input based on the blockchain activity record data and the target blockchain activity. The system may input the feature input into an artificial intelligence model, wherein the artificial intelligence model is trained to identify serial relationships of related blockchain activities corresponding to inputted target blockchain activities based on proportions of digital assets at subsets of blockchain accounts of the plurality of blockchain accounts. The system may receive an output from the artificial intelligence model. The system may generate for display, in a user interface, a visualization of the target blockchain activity based on the output, wherein the visualization comprises a subset of serial blockchain activities that correspond to the target blockchain activity.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of “a,” “an,” and “the” include plural referents unless the context clearly dictates otherwise. In addition, as used in the specification and the claims, the term “or” means “and/or” unless the context clearly dictates otherwise. Additionally, as used in the specification, “a portion” refers to a part of, or the entirety of (i.e., the entire portion), a given item (e.g., data) unless the context clearly dictates otherwise.

DETAILED DESCRIPTION OF THE DRAWINGS

Figure 1A:
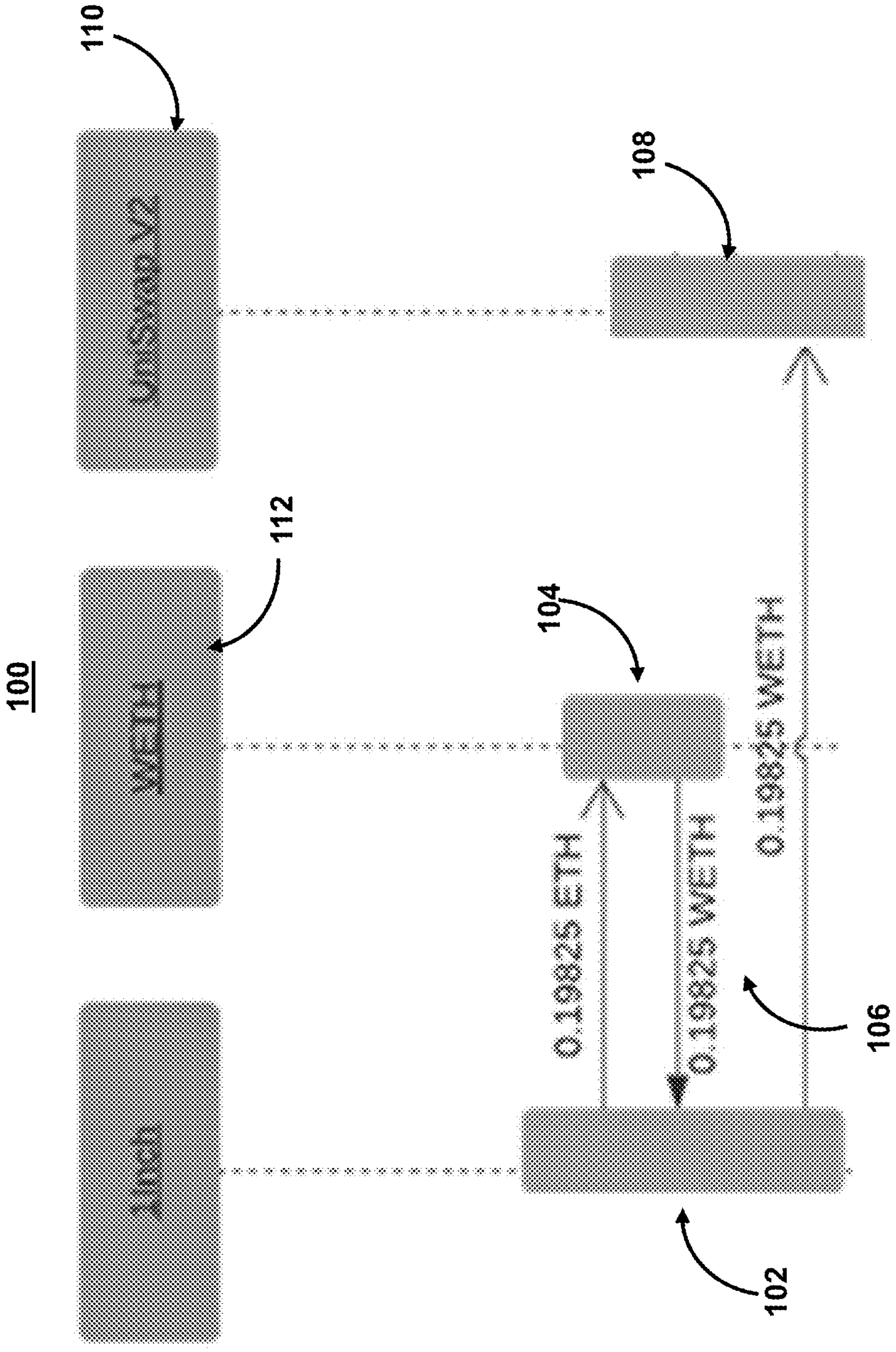
FIG. 1A-B shows an illustrative diagram for identifying patterns in blockchain activities, in accordance with one or more embodiments.

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

As stated above, systems and methods are described herein for novel uses and/or improvements to blockchains and blockchain technology, particularly in order to address, but not limited to, the technical problems described above. For example, the systems and methods may relate to monitoring, determining, and/or facilitating discovery of blockchain activities, users/entities involved in blockchain activities, a nature or scope of blockchain activities, and/or any other information related to one or more blockchain activities.

For example, the systems and methods may relate to blockchain intelligence, which may include Know-Your-Transaction (KYT) or Know-Your-Customer (KYC) applications, for blockchain activities. As referred to herein, “a blockchain activity” may comprise any activity including and/or related to blockchains and blockchain technology. For example, blockchain activities may include conducting transactions, querying a distributed ledger, generating additional blocks for a blockchain, transmitting communications-related nonfungible tokens, performing encryption/decryption, exchanging public/private keys, and/or other activities related to blockchains and blockchain technology. In some embodiments, a blockchain activity may comprise the creation, modification, detection, and/or execution of a smart contract or program stored on a blockchain. In some embodiments, a blockchain activity may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology. As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

KYT refers to monitoring, detecting, and/or facilitating discovery of blockchain activities, a nature or scope of a blockchain activities, and/or any other information related to one or more blockchain activities. Similarly, KYC refers to monitoring, determining, and/or facilitating discovery of users/entities involved in blockchain activities. In many instances, KYT and KYC applications may be intermingled with each other and an embodiment featuring one should be taken to equally apply to the other. It should be further noted that many embodiments rely on implementation involving both blockchain technology as well as artificial intelligence. As referred to herein, artificial intelligence (or simply "intelligence") may include machine learning, deep learning, computer learning and/or other techniques. Furthermore, artificial intelligence models (or simply "models") may include machine learning models, deep learning models, etc.

For example, blockchain intelligence applications may include a combination of KYT or KYC intelligence, an easy-to-use interface, and/or a real-time application programming interface (API) for collecting data (including blockchain and non-blockchain data) related to, or informative of, one or more blockchain activities. For example, blockchain intelligence applications, as described herein, may enable users working with, or trading in cryptocurrency, to comply with local and global regulations and to reduce manual work processes.

As one example, blockchain intelligence applications may detect patterns of risky activities (e.g., darknet markets, scams, sanctioned addresses, and/or deviating transactions). In addition, the real-time APIs for the blockchain intelligence applications may prevent money withdrawals from blacklisted addresses and freeze deposits from hacks, scams, and/or ransomware. Furthermore, the real-time APIs may ingest data from numerous sources, as well as data on conditions that relate to blockchain intelligence and/or rules or recommendations based on blockchain intelligence (e.g., what recommendation is generated for a blockchain activity may depend on what Anti-Money Laundering ("AML") policy that is applied).

In another example, blockchain intelligence applications may investigate, analyze, and/or link cryptocurrency transactions in the blockchain to real entities and perform monitoring thereon. In such cases, the blockchain intelligence applications may pull data from numerous sources. For example, by entering a cryptocurrency address and automatically searching through social media forums and darknet sites, the blockchain intelligence applications may identify an entity that manages a digital wallet from which a blockchain activity originated and/or traversed. As referred to herein, "a digital wallet" may comprise a repository that allows users to store, manage, and trade their cryptocurrencies and assets, interact with blockchains, and/or conduct blockchain activities using one or more applications. The digital wallet may be specific to a given blockchain protocol or may provide access to multiple blockchain protocols. In some embodiments, the system may use various types of wallets, such as hot wallets and cold wallets. Hot wallets are connected to the Internet while cold wallets are not.

The systems and methods utilizing these blockchain intelligence applications may further generate recommendations and/or visualizations on a user interface. For example, the system may generate (or generate for display on a device) a recommendation that may provide an option to perform an action (or not perform an action), provide a likelihood of certainty about an aspect of a blockchain activity, and/or may provide information about results of the blockchain intelligence. In another example, the system may generate (or generate for display on a device) a visualization of cryptocurrencies through an intuitive interface that may provide insights into a blockchain activity that was initially confusing.

As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to generate visualizations of the target blockchain activity, and the user interface may display content related to the target blockchain activity.

Figure 1B:
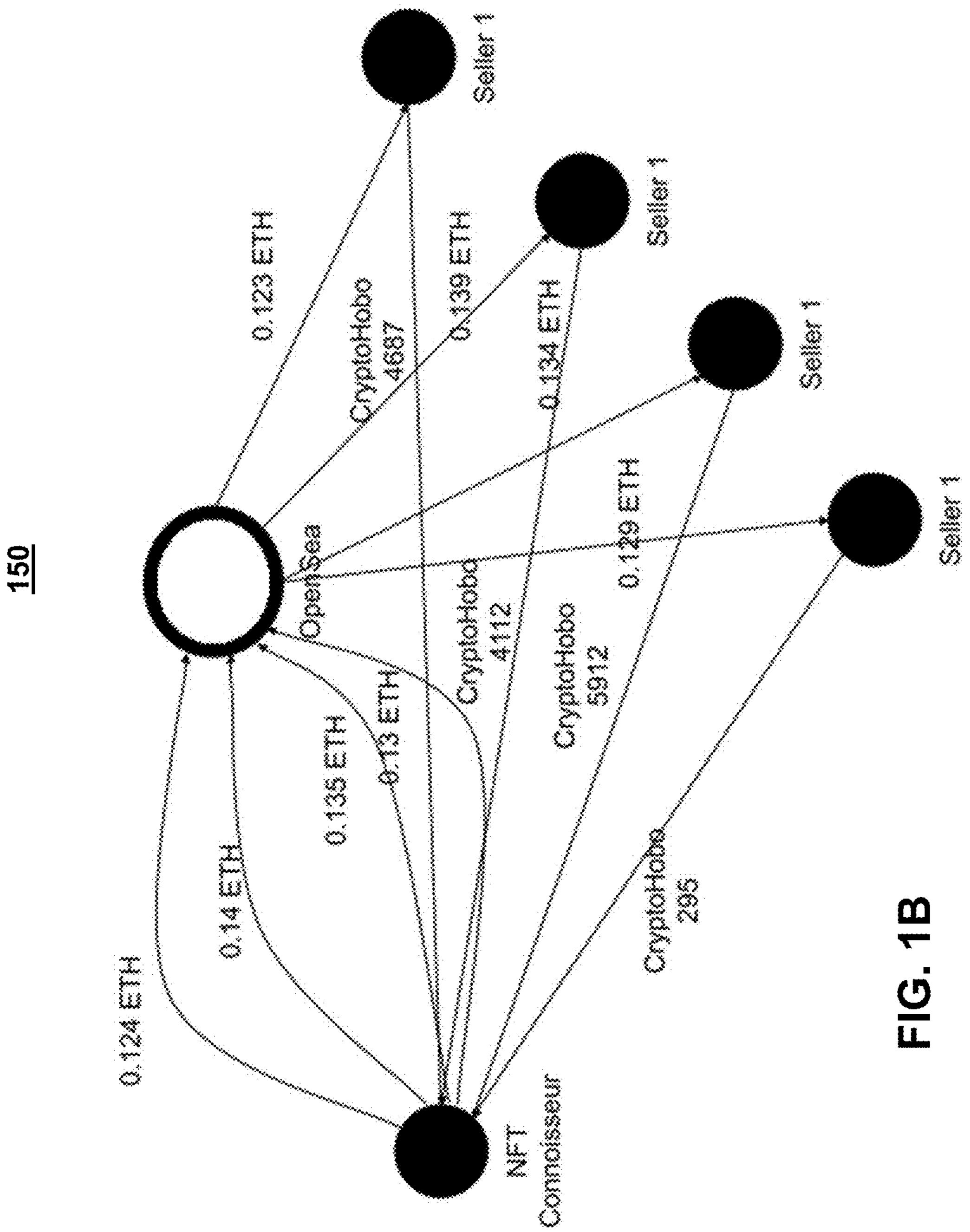

FIG. 1A-B shows an illustrative diagram for identifying patterns in blockchain activities, in accordance with one or more embodiments. For example, FIG. 1 shows diagram 100, which describes a blockchain activity. As shown, the blockchain activity may comprise a transaction from a first blockchain account (e.g., blockchain account 102) to a second blockchain account (e.g., blockchain account 108). However, included within the blockchain activity is a subset of serial blockchain activities. This subset of serial blockchain activities includes an intermediary blockchain activity. For example, as shown in diagram 100, within the broader blockchain activity from blockchain account 102 to blockchain account 104, there is a blockchain activity occurring at blockchain account 104. The presence of the intermediary blockchain activity makes identifying a pattern of a blockchain activity (e.g., a transfer of digital assets from blockchain account 102 to blockchain account 104) difficult.

For example, the intermediary blockchain activity may correspond to a different entity (e.g., entity 112) than the entity corresponding to blockchain account 104 (e.g., entity 110). Furthermore, the intermediary blockchain activity may comprise different types of activities and/or accounts. For example, the system may detect that a blockchain activity corresponds to an activity or account for collecting a network fee, platform fee, etc., as opposed to a blockchain activity or account corresponding to a transfer between relevant entities.

In response, the system may filter out these types of blockchain activities. Filtering out these types of blockchain activities, not only eliminates unnecessary blockchain activities from having to be process by the model, but also eliminates bias from any predictions that may be based on these unnecessary blockchain activities.

The system may then generate a visualization of a given blockchain activity (e.g., the blockchain activity of diagram 100) in a format that is intuitive to a user. Furthermore, the system may filter available data to show information relevant to only a target blockchain activity. As referred to herein, the target blockchain activity may comprise a blockchain activity meeting certain criteria. For example, a blockchain activity that corresponds to a particular transaction, token, entity, digital asset amount, etc.

For example, the visualization may comprise a text description related to the target blockchain activity, account, and/or entity. Additionally, or alternatively, the visualization may include a graphical representation of the subset of serial blockchain activities that correspond to the target blockchain activity, account, and/or entity. By doing so, the system may generate a representation of the subset of serial blockchain activities that correspond to the target blockchain activity, account, and/or entity that would otherwise be obscured and unintuitive to a user.

In some embodiments, the visualization may include a plurality of icons corresponding to different intermediary blockchain activities that form the target blockchain activity. The system may allow users to select these icons (e.g., via user interface 212 (FIG. 2)) in order to determine additional information related to blockchain accounts, entities, and/or blockchain activities (e.g., an amount of digital assets involved).

Figure 2:
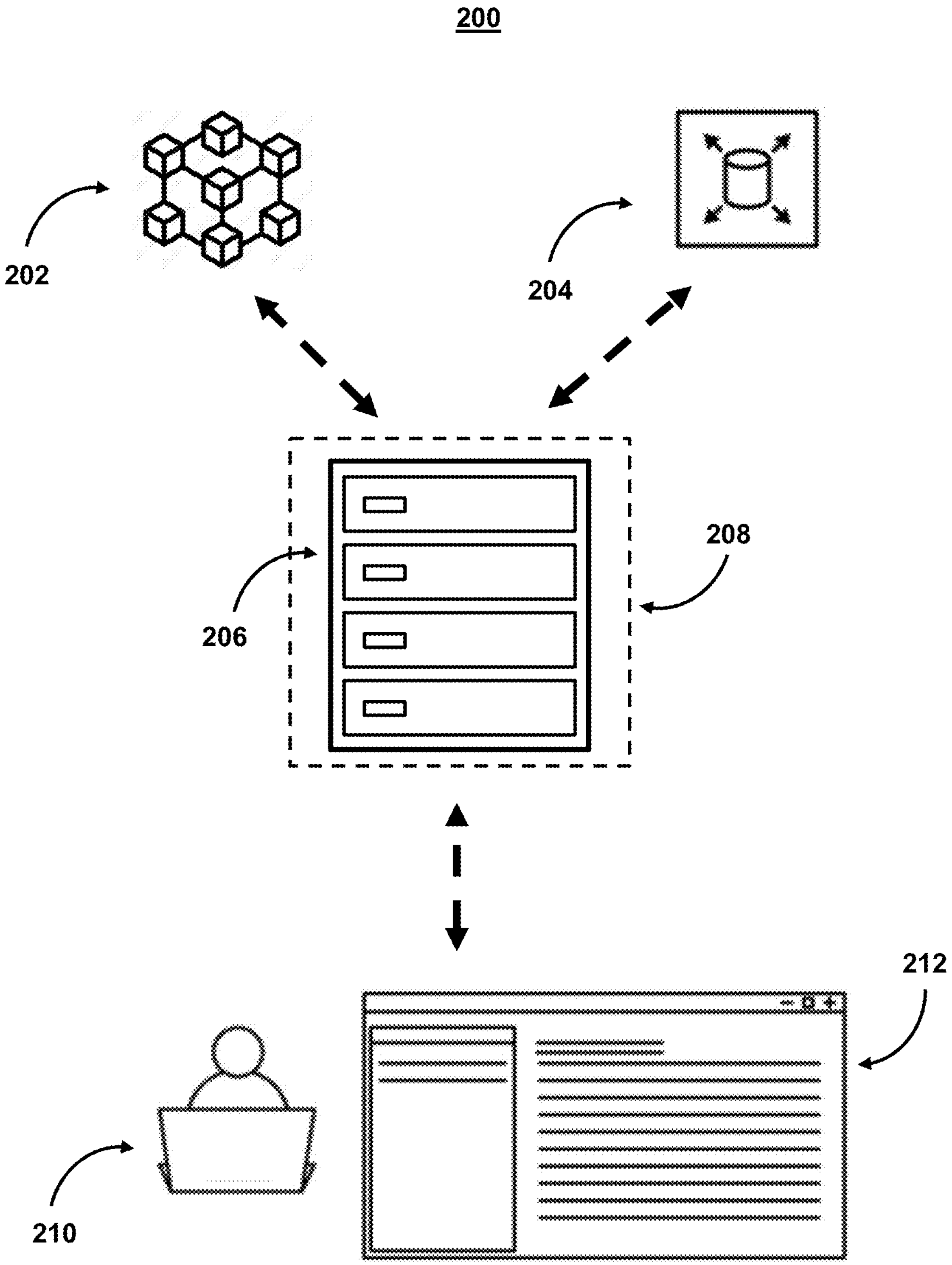
FIG. 2 shows an illustrative diagram for an intelligence service, in accordance with one or more embodiments.

FIG. 2 shows an illustrative diagram for a blockchain intelligence service, in accordance with one or more embodiments. For example, in some embodiments, the system may use intelligence service 200 to generate visualizations of the target blockchain activity. Intelligence service 200 may fetch raw data (e.g., data related to a current state and/or instance of blockchain 202) from a node of a blockchain network (e.g., as described above). Intelligence service 200 may alternatively or additionally fetch raw data (e.g., data related to other information) from data source 204 (e.g., a non-blockchain source). The system may monitor and track information from multiple data sources to develop a user and/or entity profile.

The system may monitor content generated by the user to generate user profile data. As referred to herein, "an entity profile" and/or "entity profile data" may comprise data actively and/or passively collected about an entity. For example, the entity profile data may comprise content generated by the entity and an entity characteristic for the entity. An entity profile may be content consumed and/or created by an entity.

Entity profile data may also include an entity characteristic. As referred to herein, "an entity characteristic" may include information about an entity and/or information included in a directory of stored entity settings, preferences, and information for the entity. For example, information about an entity may include historical data on blockchain activities. Additionally, or alternatively, the information may include information about entities potentially linked to another entity. For example, an entity profile may have information about the settings for installed programs and operating systems, social media information and/or accounts, financial records, etc. In some embodiments, the entity profile may be a visual display of personal data associated with a specific entity. In some embodiments, the entity profile may be digital representation of an entity's identity. The data in the entity profile may be generated based on the system actively or passively monitoring.

Intelligence service 200 may then process the data and store it in a database and/or data structure in an efficient way to provide quick access to the data. For example, intelligence database 206 may publish and/or record a subset of blockchain activities that occur for blockchain 202. Accordingly, for subsequent blockchain activities, intelligence service 200 may reference the index at intelligence database 204 as opposed to a node of blockchain 202 to provide various services at user device 210.

For example, intelligence database 206 may store a predetermined list of blockchain activities to monitor for and/or record in an index. These may include blockchain activities (e.g., "operation included," "operation removed," "operation finalized") related to a given type of blockchain activity (e.g., "transaction," "external transfer," "internal transfer," "new contract metadata," "ownership change," etc.) as well as blockchain activities related to a given protocol, protocol subgroup, and/or other characteristic (e.g., "ETH," "ERC20," and/or "ERC721"). Additionally, and/or alternatively, the various blockchain activities and metadata related to those blockchain activities (e.g., block designations, user accounts, time stamps, etc.), as well as an aggregate of multiple blockchain activities (e.g., total blockchain activities amounts, rates of blockchain activities, rates of blockchain updates, etc.) may be monitored and/or recorded.

Intelligence database 206 may likewise provide navigation and search features (e.g., support Boolean operations) for the indexed blockchain activities on user device 210 (e.g., in user interface 212). In some embodiments, intelligence database 206 may apply one or more formatting protocols to generate representations of indexed blockchain activities in a human-readable format. In some embodiments, intelligence database 206 may also tag blockchain activities based on whether or not the blockchain activity originated for a local user account (e.g., a user account corresponding to a custodial account) and/or a locally hosted digital wallet. Intelligence service 200 may determine whether a blockchain activity contains relevant information for users of intelligence service 200 by storing information about whether an address is an internal address of intelligence service 200 or one used in a digital wallet hosted by a predetermined wallet service.

System 200 may also include layer 208, which may comprise one or more APIs and/or Application Binary Interfaces ("ABIs"). In some embodiments, layer 208 may be implemented on user device 402. Alternatively, or additionally, layer 208 may reside on one or more cloud components. For example, layer 208 may reside on a server and comprise a platform service for a custodial wallet service, decentralized application, etc. Layer 208 (which may be a REST or web services API layer) may provide a decoupled interface to data and/or functionality of one or more applications.

Layer 208 may provide various low-level and/or blockchain-specific operations in order to facilitate identifying patterns in blockchain activity. For example, layer 208 may provide blockchain activities such as blockchain writes. Furthermore, layer 208 may perform a transfer validation ahead of forwarding the blockchain activity (e.g., a transaction) to another service (e.g., a crypto service). Layer 208 may then log the outcome. For example, by logging to the blockchain prior to forwarding, the layer 208 may maintain internal records and balances without relying on external verification (e.g., which may take up to ten minutes based on blockchain updating activity).

Layer 208 may also provide informational reads. For example, layer 208 (or a platform service powered by layer 208) may generate blockchain activity logs and write to an additional ledger (e.g., an internal record and/or indexer service) the outcome of the reads. If this is done, a user accessing the information through other means may see consistent information such that downstream users ingest the same data point as the user.

Layer 208 may also provide a unified API to access balances, transaction histories, and/or other blockchain activities between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

Layer 208 may provide a common, language-agnostic way of interacting with an application. In some embodiments, layer 208 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services, as well as for exchanging information with partners in business-to-business (B2B) transactions.

Layer 208 may use various architectural arrangements. For example, system 200 may be partially based on layer 208, such that there is strong adoption of SOAP and RESTful web services, using resources such as Service Repository and Developer Portal, but with low governance, standardization, and separation of concerns. Alternatively, system 200 may be fully based on layer 208, such that separation of concerns between layers such as Layer 208, services, and applications are in place.

In some embodiments, the system architecture may use a microservice approach. Such systems may use two types of layers: front-end layers and back-end layers, where microservices reside. In this kind of architecture, the role of the layer 208 may be to provide integration between front-end and back-end layers. In such cases, layer 208 may use RESTful APIs (exposition to front-end or even communication between microservices). Layer 208 may use the Advanced Message Queuing Protocol (AMQP), which is an open standard for passing business messages between applications or organizations. Layer 208 may use an open-source, high-performance remote procedure call (RPC) framework that may run in a decentralized application environment. In some embodiments, the system architecture may use an open API approach. In such cases, layer 208 may use commercial or open-source API platforms and their modules. Layer 208 may use a developer portal. Layer 208 may use strong security constraints applying a web application firewall that protects the decentralized applications and/or layer 208 against common web exploits, bots, and denial-of-service (DDOS) attacks. Layer 208 may use RESTful APIs as standard for external integration.

As shown in FIG. 2, system 200 may use layer 208 to communicate with and/or facilitate blockchain activities with user device 210 and/or other cloud components. In some embodiments, the system may also use one or more ABIs. An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, making translations between human-intended method calls and smart contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

As shown in FIG. 2, system 200 may include one or more user devices (e.g., user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that user device 210 may comprise any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain activity may equally be applied to, and correspond to, an individual user device (e.g., user device 210) performing the blockchain activity. That is, system 200 may correspond to user device (e.g., user device 210) collectively or individually.

In some embodiments, system 200 may represent a decentralized application environment. A decentralized application may comprise an application that exists on a blockchain (e.g., blockchain 202) and/or a peer-to-peer network. That is, a decentralized application may comprise an application that has a back-end that is in part powered by a decentralized peer-to-peer network such as a decentralized, open-source blockchain with smart contract functionality.

For example, the network may allow user devices (e.g., user device 210) within the network to share files and access. In particular, the peer-to-peer architecture of the network allows blockchain activities (e.g., corresponding to blockchain 202) to be conducted between the user devices in the network, without the need of any intermediaries or central authorities.

In some embodiments, the user devices of system 200 may comprise one or more cloud components. For example, cloud components may be implemented as a cloud computing system and may feature one or more component devices. It should also be noted that system 200 is not limited to one user devise (e.g., user device 210). Users may, for instance, utilize one or more devices to interact with one another, one or more servers, or other components of system 3200. It should be further noted that while one or more operations (e.g., blockchain activities) are described herein as being performed by a particular component (e.g., user device 304) of system 300, those operations may, in some embodiments, be performed by other components of system 200. As an example, while one or more operations are described herein as being performed by components of user device 210, those operations may, in some embodiments, be performed by one or more cloud components. In some embodiments, the various computers and systems described herein may include one or more computing devices that are programmed to perform the described functions. Additionally, or alternatively, multiple users may interact with system 200 and/or one or more components of system 200.

With respect to the components of system 200, each of these devices may receive content and data via input/output ("I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display such as user interface 212) for use in receiving and displaying data.

Additionally, the devices in system 200 may run an application (or another suitable program). The application may cause the processors and/or control circuitry to perform operations related to identifying patterns within blockchain activity within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

System 200 may also use one or more communication paths between devices and/or components as shown in FIG. 2. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 3:
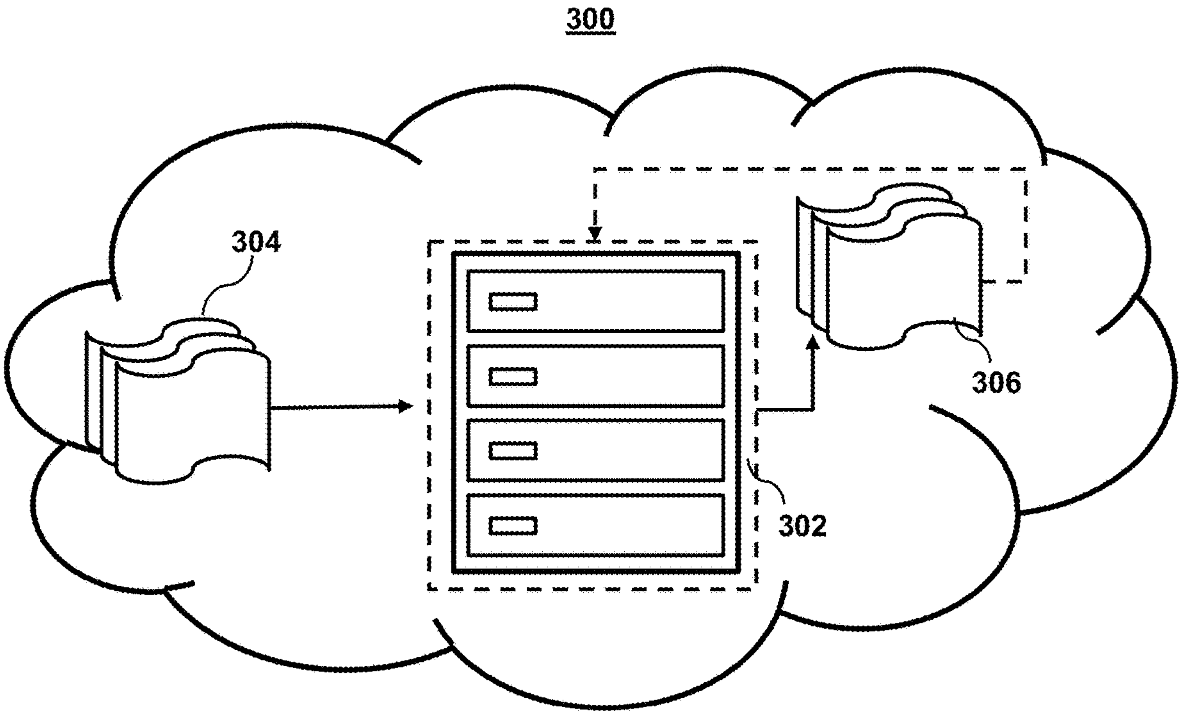
FIG. 3 shows an illustrative diagram for a model for an intelligence service, in accordance with one or more embodiments.

FIG. 3 shows illustrative components for a system for identifying patterns in blockchain activities based on multimodal data (e.g., data of numerous types and/or from different sources), in accordance with one or more embodiments. For example, FIG. 3 may show illustrative components for generating visualizations of target blockchain activity. Cloud components 310 may include model 302, which may be a machine learning model, artificial intelligence model, etc. (which may be collectively referred to herein as "models"). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. For example, in some embodiments, the system may train a model on a plurality of data types. For example, the system may derive relevant/significant entities of a blockchain transaction, as well as derive the intent of the blockchain transaction sender by using a combination of, but not limited to: net balance changes of fungible assets for all parties involved; net balance changes of nonfungible assets for all parties involved; accounts, addresses, and contracts/programs involved in the transaction, interactions between accounts, addresses, and contracts/programs involved in the transaction; public data about entities involved; and proprietary data about parties involved. For example, the system may generate feature inputs of characteristics of a known entity, a known blockchain activity, and/or an intermediary blockchain activity of a target blockchain activity in order to train the model.

In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a known entity, a known blockchain activity, an intermediary blockchain activity of a target blockchain activity, a characteristic of a blockchain activity, etc.).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a known entity, a known blockchain activity, an intermediary blockchain activity of a target blockchain activity, a characteristic of a blockchain activity, etc.).

In some embodiments, the model (e.g., model 302) may automatically perform actions based on outputs 306. In some embodiments, the model (e.g., model 302) may not perform any actions. The output of the model (e.g., model 302) may be used to generate a visualization.

Figure 4:
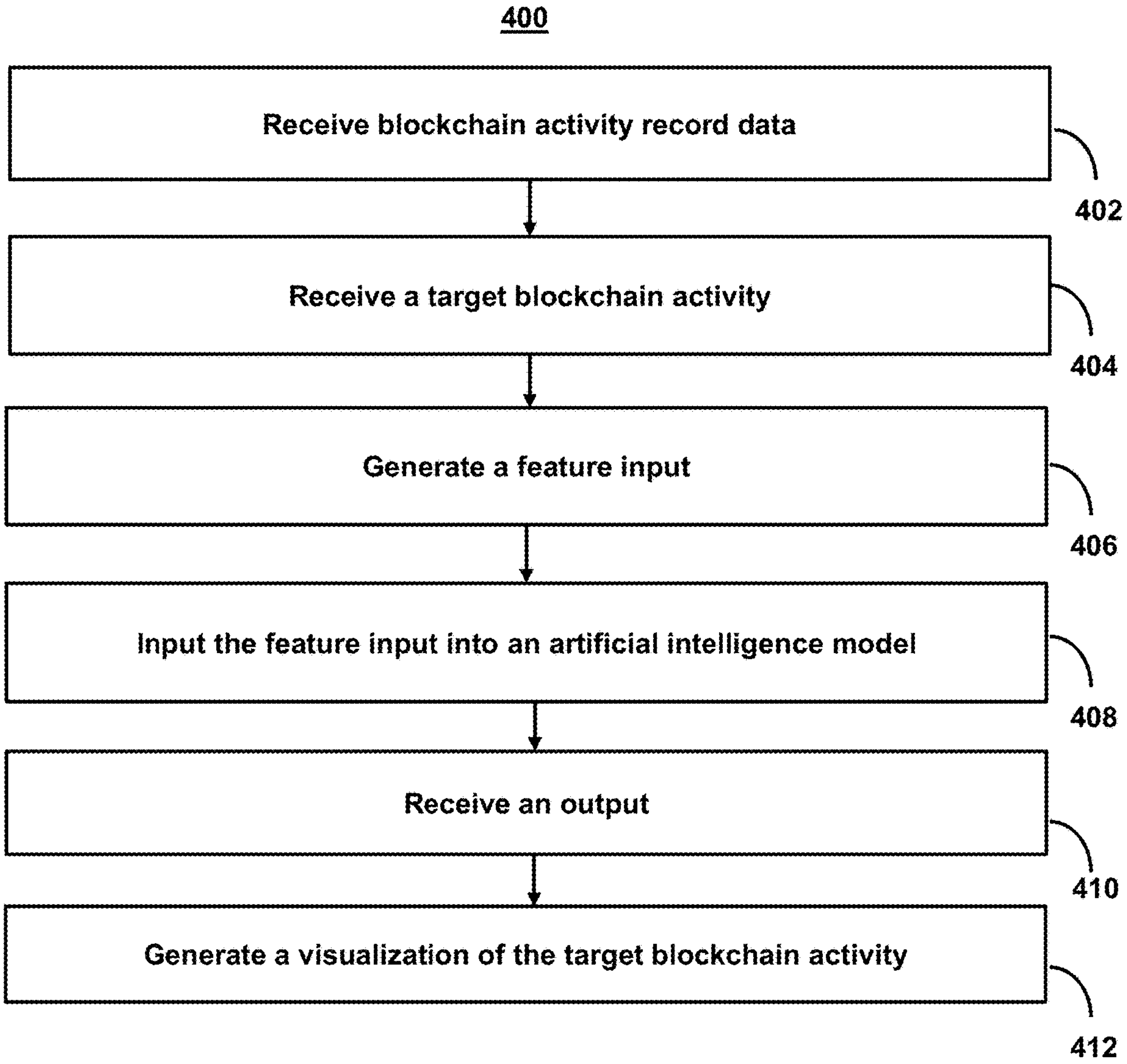
FIG. 4 shows a flowchart of the steps involved identifying patterns in blockchain activities, in accordance with one or more embodiments.

FIG. 4 shows a flowchart of the steps involved identifying patterns in blockchain activities, in accordance with one or more embodiments. For example, the system may use process 400 (e.g., as implemented on one or more system components described above) in order to identify patterns in blockchain activities based on multi-modal data using artificial intelligence models that compensate for training data featuring a high proportion of missing data points.

At step 402, process 400 (e.g., using one or more components described above) receives blockchain activity record data. For example, the system may receive blockchain activity record data for a plurality of blockchain activities involving a plurality of blockchain accounts. For example, the system may retrieve blockchain activity record data from a blockchain node. The blockchain record data may comprise blockchain activities and information about the blockchain activities (e.g., such as information about the interactions between accounts, addresses, and contracts/programs involved in the transactions). The system may retrieve this information directly from a blockchain node or may retrieve this information from an indexing service (e.g., that previously retrieved and/or indexed the data).

At step 404, process 400 (e.g., using one or more components described above) receives a target blockchain activity. For example, the system may receive a first user input selecting a target blockchain activity. For example, the system may receive a user query (e.g., via user interface 212 (FIG. 2)) requesting a visualization of a blockchain activity, smart contract, and/or blockchain account. In response, the system may generate a visualization of this information that comprises a subset of serial blockchain activities that correspond to the target blockchain activity, account, and/or entity.

At step 406, process 400 (e.g., using one or more components described above) generates a feature input. For example, the system may generate a feature input based on the blockchain activity record data and the target blockchain activity. The feature inputs may comprise an array of values that represents the blockchain activity record data and the target blockchain activity.

At step 408, process 400 (e.g., using one or more components described above) inputs the feature input into an artificial intelligence model. For example, the system may input the feature input into an artificial intelligence model, wherein the artificial intelligence model is trained to identify serial relationships of related blockchain activities corresponding to an inputted target blockchain activities based on proportions of digital assets at subsets of blockchain accounts of the plurality of blockchain accounts.

For example, the system may use the proportions of digital assets at a given blockchain account as a metric for determining whether or not the given blockchain account is related to a target blockchain activity. Notably, the target blockchain activity may include a series of intermediary activities. These intermediary activities may comprise transactions of digital assets that are either indistinguishable from other digital assets by their nature (e.g., the assets are fungible) or may be indistinguishable due to the volume of related and/or unrelated blockchain activities occurring. However, the system may identify patterns in transactions by monitoring the balance of digital assets at a given account and determining based on that balance whether or not a transfer of digital assets corresponding to the target blockchain activity has occurred. For example, the system may determine, using the artificial intelligence model, a respective proportion of digital assets corresponding to each blockchain activity in the plurality of blockchain activities. Based on the respective proportion, the system may determine, using the artificial intelligence model, that a first blockchain activity is included in the subset of serial blockchain activities.

In some embodiments, the artificial intelligence model may be further trained based on non-blockchain record data for a plurality of entities linked to one or more of the plurality of blockchain accounts, and wherein the feature input comprises information retrieved from a third party source. For example, in some embodiments, the system may train a model on a plurality of data types. For example, the system may derive relevant/significant entities of a blockchain transaction, as well as derive the intent of the blockchain transaction sender by using a combination of, but not limited to: net balance changes of fungible assets for all parties involved; net balance changes of nonfungible assets for all parties involved; accounts, addresses, and contracts/programs involved in the transaction interactions between accounts, addresses, and contracts/programs involved in the transaction; public data about entities involved; and proprietary data about parties involved.

In some embodiments, the system may determine that the first blockchain activity is included in the subset of serial blockchain activities by determining a type of the blockchain activity. For example, the system may filter out certain blockchain activities that may not be indicative of a blockchain activity being part of a larger target blockchain activity. For example, the system may detect that a blockchain activity corresponds to a network fee, platform fec, etc., as opposed to a transfer of digital assets between entities. In response, the system may filter out these types of blockchain activities. Filtering out these types of blockchain activities, not only eliminates unnecessary blockchain activities from having to be processed by the model, but also eliminates bias from any predictions that may be based on these unnecessary blockchain activities.

As such, the system may determine that the first blockchain activity corresponds to a first type of a plurality of types of blockchain activities. The system may, in response to determining that the first blockchain activity corresponds to the first type, retrieve a filtering criterion for the visualization. The system may apply the filtering criterion to the first type. The system may, in response to determining that the first type does not corresponds to the filtering criterion, generate for display, in the visualization, a first icon corresponding to the first blockchain activity.

In some embodiments, the system may determine that the first blockchain activity is included in the subset of serial blockchain activities by determining a type of the blockchain account. For example, the system may monitor for blockchain accounts that share certain characteristics (e.g., accounts having a certain balance, accounts that are frequently used (or not used), accounts related (or otherwise linked) to one or more entities, etc.). The system may then monitor blockchain activity across the blockchain network for blockchain activities that are related to these characteristics. The system may then use the identified characteristics to find patterns in the blockchain activity across the blockchain network. The system may use these patterns to detect the intermediary blockchain activities that correspond to a target blockchain activity. In some embodiments, detecting these patterns and/or generating visualizations that are helpful to a user may require some intermediary blockchain activities to be filtered out. The system may apply filtering criterion to do so.

As such, the system may determine that the first blockchain activity corresponds to a first blockchain account. The system may determine that the first blockchain account corresponds to a first type of a plurality of types of blockchain accounts. The system may, in response to determining that the first blockchain account corresponds to the first type, retrieve a filtering criterion for the visualization. The system may apply the filtering criterion to the first type. The system may, in response to determining that the first type does not correspond to the filtering criterion, generate for display, in the visualization, a first icon corresponding to the first blockchain activity.

Additionally, or alternatively, the system may determine, using the artificial intelligence model, a subset of blockchain accounts of the plurality of blockchain accounts corresponding to the target blockchain activity. The system may determine, using the artificial intelligence model, a respective proportion of digital assets corresponding to each blockchain account in the subset of blockchain accounts. The system may, based on the respective proportion, determine, using the artificial intelligence model, that a first blockchain account in the subset of blockchain accounts corresponds to the target blockchain activity.

In some embodiments, the system may also filter out activities and/or accounts corresponding to given characteristics. For example, the system may, in response to determining that the first blockchain account in the subset of blockchain accounts corresponds to the target blockchain activity, retrieve a filtering criterion for the visualization. The system may apply the filtering criterion to a characteristic of the first blockchain account. The system may, in response to determining that the characteristic does not corresponds to the filtering criterion, generate for display, in the visualization, a first icon corresponding to the first blockchain account. For example, the system may filter out certain blockchain accounts that may not be indicative of a blockchain activity being part of a larger target blockchain activity.

For example, the system may determine characteristics about the blockchain account or activity (e.g., frequency of use, balance, etc.) and apply filtering criteria to these characteristics. In one example, the characteristic may be based on an amount of a digital asset at issue in a blockchain activity. For example, in order to monitor only relevant blockchain activities (or blockchain activities relevant to a target blockchain activity), the system may monitor for blockchain activities that feature an amount of digital assets corresponding to the amount at issue in the target blockchain activity. In some embodiments, this may be a percentage of that amount (or some other metric). As such, the system may determine an amount of a digital asset corresponding to the target blockchain activity. The system may then determine the filtering criterion based on a percentage of the amount.

At step 410, process 400 (e.g., using one or more components described above) receives an output. For example, the system may receive an output from the artificial intelligence model. For example, the output may comprise an array of values that may be interpreted in order to generate a visualization. In some embodiments, the output may comprise one or more predictions related to the target blockchain activity and/or a confidence level for the one or more predictions.

At step 412, process 400 (e.g., using one or more components described above) generates a visualization of the target blockchain activity. For example, the system may generate for display, in a user interface, a visualization of the target blockchain activity based on the output, wherein the visualization comprises a subset of serial blockchain activities that correspond to the target blockchain activity. For example, the visualization may comprise a text description related to the target blockchain activity, account, and/or entity. Additionally or alternatively, the visualization may include a graphical representation of the subset of serial blockchain activities that correspond to the target blockchain activity, account, and/or entity. By doing so, the system may generate a representation of the subset of serial blockchain activities that correspond to the target blockchain activity, account, and/or entity that would otherwise be obscured and unintuitive to a user.

In some embodiments, the visualization may include a plurality of icons corresponding to different intermediary blockchain activities that form the target blockchain activity. The system may allow users to select these icons (e.g., via user interface 212 (FIG. 2)) in order to determine additional information related to blockchain accounts, entities, and/or blockchain activities (e.g., an amount of digital assets involved). For example, the visualization may comprise a graphical representation of the blockchain activities. In such cases, the system may generate for display, in the user interface, a plurality of icons corresponding to blockchain accounts corresponding to the subset of serial blockchain activities. The system may then generate a plurality of lines connecting the plurality of icons, wherein the plurality of lines represents characteristics of the subset of serial blockchain activities.

In some embodiments, the subset of serial blockchain activities comprise a first subset of blockchain activities on a first blockchain network, and a second subset of blockchain activities on a second blockchain network. For example, the system may retrieve data from multiple sources, including multiple blockchain networks. The system may use this information to determine cross-chain patterns and/or generate visualizations featuring the cross-chain patterns.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method comprising: receiving blockchain activity record data for a plurality of blockchain activities involving a plurality of blockchain accounts; receiving a first user input selecting a target blockchain activity; generating a feature input based on the blockchain activity record data and the target blockchain activity; inputting the feature input into an artificial intelligence model, wherein the artificial intelligence model is trained to identify serial relationships of related blockchain activities corresponding to inputted target blockchain activities based on proportions of digital assets at subsets of blockchain accounts of the plurality of blockchain accounts; receiving an output from the artificial intelligence model; and generating for display, in a user interface, a visualization of the target blockchain activity based on the output, wherein the visualization comprises a subset of serial blockchain activities that correspond to the target blockchain activity.
2. The method of the preceding embodiment, wherein the method is for identifying patterns in blockchain activities based on multi-modal data using artificial intelligence models that compensate for training data featuring a high proportion of missing data points.
3. The method of any one of the preceding embodiments, further comprising: determining, using the artificial intelligence model, a respective proportion of digital assets corresponding to each blockchain activity in the plurality of blockchain activities; and based on the respective proportion, determining, using the artificial intelligence model, that a first blockchain activity is included in the subset of serial blockchain activities.
4. The method of any one of the preceding embodiments, wherein determining that the first blockchain activity is included in the subset of serial blockchain activities further comprises: determining that the first blockchain activity corresponds to a first type of a plurality of types of blockchain activities; in response to determining that the first blockchain activity corresponds to the first type, retrieving a filtering criterion for the visualization; applying the filtering criterion to the first type; and in response to determining that the first type does not corresponds to the filtering criterion, generating for display, in the visualization, a first icon corresponding to the first blockchain activity.
5. The method of any one of the preceding embodiments, wherein determining that the first blockchain activity is included in the subset of serial blockchain activities further comprises: determining that the first blockchain activity corresponds to a first blockchain account; determining that the first blockchain account corresponds to a first type of a plurality of types of blockchain accounts; in response to determining that the first blockchain account corresponds to the first type, retrieving a filtering criterion for the visualization; applying the filtering criterion to the first type; and in response to determining that the first type does not correspond to the filtering criterion, generating for display, in the visualization, a first icon corresponding to the first blockchain activity.
6. The method of any one of the preceding embodiments, further comprising: determining, using the artificial intelligence model, a subset of blockchain accounts of the plurality of blockchain accounts corresponding to the target blockchain activity; determining, using the artificial intelligence model, a respective proportion of digital assets corresponding to each blockchain account in the subset of blockchain accounts; and based on the respective proportion, determining, using the artificial intelligence model, that a first blockchain account in the subset of blockchain accounts corresponds to the target blockchain activity.
7. The method of any one of the preceding embodiments, further comprising: in response to determining that the first blockchain account in the subset of blockchain accounts corresponds to the target blockchain activity, retrieving a filtering criterion for the visualization; applying the filtering criterion to a characteristic of the first blockchain account; and in response to determining that the characteristic does not corresponds to the filtering criterion, generating for display, in the visualization, a first icon corresponding to the first blockchain account.
8. The method of any one of the preceding embodiments, further comprising: determining an amount of a digital asset corresponding to the target blockchain activity; and determining the filtering criterion based on a percentage of the amount.
9. The method of any one of the preceding embodiments, wherein the artificial intelligence model is further trained based on non-blockchain record data for a plurality of entities linked to one or more of the plurality of blockchain accounts, and wherein the feature input comprises information retrieved from a third party source.
10. The method of any one of the preceding embodiments, wherein generating the visualization further comprises: generating for display, in the user interface, a plurality of icons corresponding to blockchain accounts corresponding to the subset of serial blockchain activities; and generating a plurality of lines connecting the plurality of icons, wherein the plurality of lines represent characteristics of the subset of serial blockchain activities.

11. The method of any one of the preceding embodiments, wherein the subset of serial blockchain activities comprise a first subset of blockchain activities on a first blockchain network, and a second subset of blockchain activities on a second blockchain network.
12. A tangible, non-transitory, machine-readable medium storing instructions that, when executed by a data processing apparatus, cause the data processing apparatus to perform operations comprising those of any of embodiments 1-11.
13. A system comprising one or more processors; and memory storing instructions that, when executed by the processors, cause the processors to effectuate operations comprising those of any of embodiments 1-11.
14. A system comprising means for performing any of embodiments 1-11.

What is claimed is:

1. A system for identifying patterns in blockchain activities based on multi-modal data using artificial intelligence models that compensate for training data featuring a high proportion of missing data points, the system comprising:

one or more processors; and one or more non-transitory, computer-readable media comprising instructions that when executed by the one or more processors cause operations comprising:

receiving a target blockchain activity and blockchain activity record data for a plurality of blockchain activities involving a plurality of blockchain accounts;

generating for display, in a user interface, a visualization of the target blockchain activity using an artificial intelligence model, wherein the artificial intelligence model is trained to identify serial relationships of related blockchain activities corresponding to inputted target blockchain activities by determining whether proportions of digital assets at subsets of blockchain accounts of the plurality of blockchain accounts corresponds to the inputted target blockchain activities, and wherein the visualization comprises a subset of serial blockchain activities that correspond to the target blockchain activity;

determining that a first blockchain activity in the subset of serial blockchain activities corresponds to a first type of a plurality of types of blockchain activities;

retrieving a filtering criterion for the visualization;

applying the filtering criterion to the first type; and in response to determining that the first type does not corresponds to the filtering criterion, generating for display, in the visualization, a first icon corresponding to the first blockchain activity.

2. A method for identifying patterns in blockchain activities based on multi-modal data using artificial intelligence models that compensate for training data featuring a high proportion of missing data points, the method comprising:

receiving a target blockchain activity and blockchain activity record data for a plurality of blockchain activities involving a plurality of blockchain accounts;

generating for display, in a user interface, a visualization of the target blockchain activity using an artificial intelligence model, wherein the artificial intelligence model is trained to identify serial relationships of related blockchain activities corresponding to inputted target blockchain activities by determining whether proportions of digital assets at subsets of blockchain accounts of the plurality of blockchain accounts corresponds to the inputted target blockchain activities, and wherein the visualization comprises a subset of serial blockchain activities that correspond to the target blockchain activity;

determining that a first blockchain activity in the subset of serial blockchain activities corresponds to a first type of a plurality of types of blockchain activities;

retrieving a filtering criterion for the visualization;

applying the filtering criterion to the first type; and in response to determining that the first type does not corresponds to the filtering criterion, generating for display, in the visualization, a first icon corresponding to the first blockchain activity.

3. The method of claim 2, further comprising:

determining, using the artificial intelligence model, a respective proportion of digital assets corresponding to each blockchain activity in the plurality of blockchain activities; and based on the respective proportion, determining, using the artificial intelligence model, that the first blockchain activity is included in the subset of serial blockchain activities.

4. The method of claim 2, further comprising:

generating a feature input based on the blockchain activity record data and the target blockchain activity; and inputting the feature input into the artificial intelligence model to generate an output.

5. The method of claim 3, wherein determining that the first blockchain activity is included in the subset of serial blockchain activities further comprising:

determining that the first blockchain activity corresponds to a first blockchain account;

determining that the first blockchain account corresponds to a first type of a plurality of types of blockchain accounts;

in response to determining that the first blockchain account corresponds to the first type of the plurality of types of blockchain accounts, retrieving a second filtering criterion for the visualization;

applying the second filtering criterion to the first type of the plurality of types of blockchain accounts; and in response to determining that the first type does not correspond to the filtering criterion, generating for display, in the visualization, a second icon corresponding to the first blockchain activity.

6. The method of claim 2, further comprising:

determining, using the artificial intelligence model, a subset of blockchain accounts of the plurality of blockchain accounts corresponding to the target blockchain activity;

determining, using the artificial intelligence model, a respective proportion of digital assets corresponding to each blockchain account in the subset of blockchain accounts; and based on the respective proportion, determining, using the artificial intelligence model, that a first blockchain account in the subset of blockchain accounts corresponds to the target blockchain activity.

7. The method of claim 6, further comprising:

in response to determining that the first blockchain account in the subset of blockchain accounts corresponds to the target blockchain activity, retrieving a filtering criterion for the visualization;

applying the filtering criterion to a characteristic of the first blockchain account; and in response to determining that the characteristic does not correspond to the filtering criterion, generating for display, in the visualization, a first icon corresponding to the first blockchain account.

8. The method of claim 7, further comprising:

determining an amount of a digital asset corresponding to the target blockchain activity; and determining the filtering criterion based on a percentage of the amount.

9. The method of claim 2, wherein the artificial intelligence model is further trained based on non-blockchain record data for a plurality of entities linked to one or more of the plurality of blockchain accounts, and wherein a feature input for the artificial intelligence model comprises information retrieved from a third party source.

10. The method of claim 2, wherein generating the visualization further comprises:

generating for display, in the user interface, a plurality of icons corresponding to blockchain accounts corresponding to the subset of serial blockchain activities; and generating a plurality of lines connecting the plurality of icons, wherein the plurality of lines represent characteristics of the subset of serial blockchain activities.

11. The method of claim 2, wherein the subset of serial blockchain activities comprise a first subset of blockchain activities on a first blockchain network, and a second subset of blockchain activities on a second blockchain network.

12. A non-transitory, computer-readable medium, comprising instructions that, when executed by one or more processors, cause operations comprising:

receiving a target blockchain activity and blockchain activity record data for a plurality of blockchain activities involving a plurality of blockchain accounts;

generating for display, in a user interface, a visualization of the target blockchain activity using an artificial intelligence model, wherein the artificial intelligence model is trained to identify serial relationships of related blockchain activities corresponding to inputted target blockchain activities by determining whether proportions of digital assets at subsets of blockchain accounts of the plurality of blockchain accounts corresponds to the inputted target blockchain activities, and wherein the visualization comprises a subset of serial blockchain activities that correspond to the target blockchain activity;

determining that a first blockchain activity in the subset of serial blockchain activities corresponds to a first type of a plurality of types of blockchain activities;

retrieving a filtering criterion for the visualization;

applying the filtering criterion to the first type; and in response to determining that the first type does not corresponds to the filtering criterion, generating for display, in the visualization, a first icon corresponding to the first blockchain activity.

13. The non-transitory, computer-readable medium of claim 12, wherein the instructions further cause operations comprising:

determining, using the artificial intelligence model, a respective proportion of digital assets corresponding to each blockchain activity in the plurality of blockchain activities; and based on the respective proportion, determining, using the artificial intelligence model, that the first blockchain activity is included in the subset of serial blockchain activities.

14. The non-transitory, computer-readable medium of claim 12, wherein the instructions further cause operations comprising:

generating a feature input based on the blockchain activity record data and the target blockchain activity; and inputting the feature input into the artificial intelligence model to generate an output.

15. The non-transitory, computer-readable medium of claim 13, wherein determining that the first blockchain activity is included in the subset of serial blockchain activities further comprises:

determining that the first blockchain activity corresponds to a first blockchain account;

determining that the first blockchain account corresponds to a first type of a plurality of types of blockchain accounts;

in response to determining that the first blockchain account corresponds to the first type of the plurality of types of blockchain accounts, retrieving a second filtering criterion for the visualization;

applying the second filtering criterion to the first type of the plurality of types of blockchain accounts; and in response to determining that the first type of the plurality of types of blockchain accounts does not corresponds to the second filtering criterion, generating for display, in the visualization, a second icon corresponding to the first blockchain activity.

16. The non-transitory, computer-readable medium of claim 12, wherein the instructions further cause operations comprising:

determining, using the artificial intelligence model, a subset of blockchain accounts of the plurality of blockchain accounts corresponding to the target blockchain activity;

determining, using the artificial intelligence model, a respective proportion of digital assets corresponding to each blockchain account in the subset of blockchain accounts; and based on the respective proportion, determining, using the artificial intelligence model, that a first blockchain account in the subset of blockchain accounts corresponds to the target blockchain activity.

17. The non-transitory, computer-readable medium of claim 16, wherein the instructions further cause operations comprising:

in response to determining that the first blockchain account in the subset of blockchain accounts corresponds to the target blockchain activity, retrieving a filtering criterion for the visualization;

applying the filtering criterion to a characteristic of the first blockchain account; and in response to determining that the characteristic does not correspond to the filtering criterion, generating for display, in the visualization, a first icon corresponding to the first blockchain account.

18. The non-transitory, computer-readable medium of claim 17, wherein the instructions further cause operations comprising:

determining an amount of a digital asset corresponding to the target blockchain activity; and determining the filtering criterion based on a percentage of the amount.

19. The non-transitory, computer-readable medium of claim 12, wherein the artificial intelligence model is further trained based on non-blockchain record data for a plurality of entities linked to one or more of the plurality of blockchain accounts, and wherein a feature input for the artificial intelligence model comprises information retrieved from a third party source.

20. The non-transitory, computer-readable medium of claim 12, wherein generating the visualization further comprises:

generating for display, in the user interface, a plurality of icons corresponding to blockchain accounts corresponding to the subset of serial blockchain activities; and generating a plurality of lines connecting the plurality of icons, wherein the plurality of lines represent characteristics of the subset of serial blockchain activities.

* * * * *